United States Patent

Autry et al.

[11] Patent Number: 6,088,413
[45] Date of Patent: Jul. 11, 2000

[54] APPARATUS FOR REDUCING JITTER IN A DESYNCHRONIZER

[75] Inventors: Chris B. Autry, Bridgewater, N.J.; Henry W. L. Owen, Smyrna, Ga.; Michael Wolf, Mundelsheim, Germany

[73] Assignee: Alcatel, Paris, France

[21] Appl. No.: 09/059,030

[22] Filed: Apr. 13, 1998

Related U.S. Application Data

[60] Provisional application No. 60/046,043, May 9, 1997.

[51] Int. Cl.⁷ .............................. H04L 7/00; H04L 25/00; H04L 25/40
[52] U.S. Cl. ........................... 375/372; 370/506; 370/516
[58] Field of Search .................................... 375/371, 372, 375/373, 375, 363, 354, 225; 370/506, 503, 505, 507, 516; 369/60

[56] References Cited

U.S. PATENT DOCUMENTS

| | | |
|---|---|---|
| 4,941,156 | 7/1990 | Stern et al. . |
| 4,996,698 | 2/1991 | Nelson . |
| 5,052,025 | 9/1991 | Duff et al. . |
| 5,157,655 | 10/1992 | Hamlin, Jr. et al. . |
| 5,200,982 | 4/1993 | Weeber . |
| 5,202,904 | 4/1993 | Kamada . |
| 5,245,636 | 9/1993 | Sari et al. . |
| 5,268,935 | 12/1993 | Mediavilla et al. . |
| 5,272,703 | 12/1993 | Peters . |
| 5,285,206 | 2/1994 | Peters et al. . |
| 5,311,511 | 5/1994 | Reilly et al. . |
| 5,337,334 | 8/1994 | Molloy . |
| 5,349,310 | 9/1994 | Rieder et al. . |
| 5,402,452 | 3/1995 | Powell et al. . |
| 5,404,380 | 4/1995 | Powell et al. . |
| 5,457,717 | 10/1995 | Bellamy .................................. 372/272 |
| 5,471,511 | 11/1995 | DeLanghe et al. . |
| 5,528,530 | 6/1996 | Powell et al. . |
| 5,796,796 | 8/1998 | Wang ....................................... 375/272 |

OTHER PUBLICATIONS

"Design and Performance Verification of a SONET-TO-DS3 Desynchronizer," Hamlin, Jr., TransSwitch Corp., Shelton, CT, 1991 IEEE pp. 0761–0764.
"Transmission Networking: SONET and the Synchronous Digital Hierarchy," Sexton and Reid, Artech House, 1992, pp. 104–105.
"Synchronization and Timing of SDH Networks," W. E. Powell et al., Electrical Communication, 4th Quarter 1993, pp. 349–358.
"Jitter Reduction in SDH Networks," Sari and Karam, ICC '91, pp. 1413–1417.

Primary Examiner—Chi H. Pham
Assistant Examiner—Jean B. Corrielus
Attorney, Agent, or Firm—Ware, Fressola, Van der Sluys & Adolphson LLP

[57] ABSTRACT

An apparatus, to be used in a desynchronizer, for minimizing the output jitter of the desynchronizer. The desynchronizer is assumed to include a bit buffer for staging data that is to be output. The desynchronizer is also assumed to include a means for decoding the input signal to determine how justification opportunities in the input signal are used and therefore what justification bits must be leaked by the desynchronizer. The apparatus and method of the present invention uses the information about the incoming justification bits or incoming justification bytes and the state of the buffer to determine the longest possible time to wait before issuing a command to momentarily speed up or delay outputting the next data unit from the bit buffer. This speeding up or delay is caused by sending a clock signal to the bit buffer that is shifted in phase by a small amount, thereby spreading out the effect of an incoming positive or negative justification bit or byte over many periods of the output clock of the desynchronizer.

7 Claims, 3 Drawing Sheets

APPARATUS FOR REDUCING JITTER IN A DESYNCHRONIZER

This application claims priority from U.S. Provisional Application 60/046,043, filed May 9, 1997.

BACKGROUND OF THE INVENTION

The present invention pertains to the field of desynchronizers. More particularly, the present invention pertains to an apparatus for implementing a desynchronizer in a way that reduces output jitter, especially output jitter caused by bit and byte justifications in the input to a desynchronizer.

Jitter is a term used to refer to fluctuations above a certain frequency in the bit rate of a signal. It is known that it is necessary to control jitter at the output of a desynchronizer connecting a Synchronous Digital Hierarchy (SDH) Network, or, equivalently, Synchronous Optical Network (SONET), to a Plesiochronous Digital Hierarchy (PDH) network. A desynchronizer is used to extract from an SDH signal a particular PDH signal. The output of the desynchronizer providing the PDH signal can have unacceptable jitter either because the SDH source used bit justification in encoding the PDH signal within the SDH signal, or because byte justification was used by some upstream SDH source to account for clock irregularities or frequency offsets between clocks.

In essence, the function of a desynchronizer is to extract from a composite signal a particular component, or tributary, that contains, in a frame structure having overhead and a payload, PDH data as its payload. Then the desynchronizer reads only the PDH data into a buffer from which it is able to output the PDH data at a particular output rate. The output rate is of course a fraction of the input data rate, i.e. the rate at which the desynchronizer reads the composite signal, but is necessarily great enough that the buffer does not overflow. Since the data to be output arrives irregularly however, even without any clock irregularity or bit or byte justification upstream of the desynchronizer, the desynchronizer must use a buffer in order to output data bits at a smooth, regular rate. The average rate at which data arrives at the buffer must equal the average rate at which data is read out of the buffer. With upstream bit and byte justifications, the desynchronizer must account for added irregularity in the rate at which the data arrives at the buffer.

For example, one component of an SDH signal, the tributary unit-12 (TU-12) component, which corresponds to an E1 PDH signal, may be conveyed by the TU-12 component of an SDH signal, extracted by a desynchronizer, and provided by the desynchronizer to a PDH network. An E1 signal is the European primary rate PDH signal, and it has a nominal bit rate of 2.048 Mbits/sec. Both the SDH and PDH signals are organized as frames consisting of an overhead part and a payload part. The source of the SDH signal may encode the E1 signal within the payload of a frame of the TU-12 component and, from time to time, use bit justification (positive or negative) to adjust to the pace at which it receives E1 data.

Bit justification can be either positive or negative. In negative bit justification, the source that provides the TU-12 frames conveying the E1 data uses, from time to time, some of the overhead, in addition to the payload, to convey E1 data, thereby increasing the rate of output, which it does in order to keep pace with the rate at which it receives E1 data. Alternatively, the source may, from time to time, not use the full amount of the TU-12 payload to convey E1 data, thereby slowing the pace at which it outputs the E1 signal, again to keep pace with the rate at which it receives E1 data. This procedure is termed positive bit justification.

Bit justification does not appear as jitter at the output of a source providing a TU-12 signal, because the bits are stuffed in TU-12 frames that always have the same number of bytes. However, in extracting an E1 signal from TU-12 frames, a desynchronizer encounters clumps of different numbers of bits of E1 data, the difference from clump to clump resulting from the bit and byte justifications. In providing the E1 signal to the PDH network, a desynchronizer produces output jitter as it leaks the justification bits onto the PDH network.

In the case of providing an E1 signal from a TU-12 component of an SDH signal, the term jitter is used to refer to all fluctuations above some frequency in the clock used to control output to the PDH network. (Lower frequency fluctuations are termed "wander".) Jitter performance is characterized in ITU-T Recommendation G.783, "Characteristics of Synchronous Digital Hierarchy (SDH) Equipment Functional Blocks," 1994, which is hereby incorporated by reference.

Part of the SDH signal, referred to as the tributary unit-12 (TU-12) component, contains the data of the PDH signal as well as overhead bits. In the prior art, as in the present invention, all of the SDH bits except for the PDH data are dropped out of a desynchronizer. To do this, the desynchronizer typically has a buffer and writes only the PDH data into the buffer using first a clock gapped to correspond only to the TU-12 component of the full incoming SDH synchronous transport module-N (STM-N) signal of the desynchronizer node. Then, using a circuit to detect overhead and justification bits of an SDH signal and the TU-12 clock signal, the desynchronizer creates a further gapped clock corresponding only to the E1 PDH data conveyed by the TU-12 component of the SDH signal. The desynchronizer uses this twice-gapped clock to write to its buffers only the PDH data in the input signal.

To clock the data out of the buffer at an approximately constant rate, the desynchronizer must smooth the twice-gapped write clock to produce a regular (non-gapped) read clock for outputting the PDH data. To provide this smoothed output at a rate that prevents overflow of the buffer, a prior art desynchronizer may use a phase-locked loop (PLL) that includes a stable clock signal from which it derives the rate at which data is output.

The prior art often uses a phase locked loop, with at least one analog component, comprising a phase detector, filter, and voltage-controlled oscillator. In a typical analog/digital PLL, the phase detector and filter are digital, and the voltage-controlled oscillator (VCO) is analog. The performance of any of these PLLs varies with age, temperature, and voltage fluctuations. All-digital PLLs obviously replace the analog components with their digital counterparts. For example, an all-digital PLL uses a digitally-controlled oscillator instead of a VCO, and its performance is far less sensitive to age, temperature, and voltage fluctuations. Other benefits of an all-digital phase locked loop include a narrower bandwidth, a higher operating frequency, and higher-order loops. W. T. Greer, Jr., "Digital Phase-Locked Loops Move Into Analog Territory," Electronic Design, Mar. 31, 1982, pp. 95–100.

Thus, the prior art provides for either good jitter control and undesired complexity, or else inadequate jitter control. What is needed is a desynchronizer that has very good jitter performance and yet has a low-level of complexity so that it is feasible to implement.

SUMMARY OF THE INVENTION

The present invention is an apparatus, for use in a desynchronizer, that reduces jitter at the output of the desynchronizer by momentarily speeding up or slowing down the desynchronizer output as infrequently as possible, the jitter an inevitable consequence of the desynchronizer having to compensate for incoming justification bits or incoming justification bytes, or jitter in the input signal.

Some justification bits of the incoming signal result from bit justifications by a network node producing the signal input to the desynchronizer. Bit justification is, in general, the means by which a higher rate signal may be encoded to convey a signal of a lower rate. A desynchronizer using the apparatus of the present invention has as an input a composite SDH or STM-1 signal including, as one of its components, a higher rate signal, from which a recovered clock signal is derived, conveying a lower rate signal. The lower rate signal contains both overhead and payload. The desynchronizer extracts from the lower rate signal a PDH signal, which is here called the data of the lower rate signal and is conveyed for the most part by the payload of the lower rate signal, although, depending on what upstream bit and byte justifications have occurred, for any give frame, some of the payload may not have been used, or some of the overhead may have been used to convey PDH data to be output.

Thus, a desynchronizer using the present invention would typically gap the full incoming signal first to produce only the component signal carrying the lower rate signal of interest, then extract from the component signal only the lower rate signal of interest, and then still have to accommodate any extra or missing bits in the component signal stuffed to account for the difference in commensurability of the higher and lower rate signals.

A desynchronizer according to the present invention is geared to handle, just as readily as it handles incoming bit justification, incoming byte justification, used by upstream sources of a synchronous composite signal to account for clock irregularities or clock frequency offsets.

If there were no jitter in the incoming signal and no bit justifications included in the incoming signal, the present invention would simply clock the bit buffer of the desynchronizer to output the bits of the lower rate output signal at a constant rate, the expected rate of the lower rate output signal. Thus, the bit buffer and a regular output clock are all that are needed to produce the smooth output of the desynchronizer in the absence of any input jitter or bit justifications in the input signal.

To account for bit and byte justifications, however, the present invention uses information about the justification bits included in the incoming component signal and information about the state of the buffer to determine how long to wait before momentarily speeding up or slowing down the output clock by adjusting its phase. The waiting period is here called a leak interval. The apparatus makes this determination using an algorithm that results in an ideally longest possible leak interval the apparatus waits before again adjusting the output clock by changing its phase. Since the incoming justification bit rate is continually changing, so too is the leak interval, which is determined based on the expression $$N/(MB_{avg}),$$

where N is a designer specified integer, M is how much faster the internal clock of the apparatus runs (in pulses per second) compared to the ideal rate $f_L$ of the lower rate output signal clocking for outputting data from the bit buffer, and $B_{avg}$ is a recently observed average incoming justification bit rate. Further, according to the present invention, in response to any command to advance or delay the phase of the output clock, the present invention advances or delays the phase of the output clock by the amount, given by $$N/(Mf_L)$$

where N is a number typically much smaller than M so that the phase of the output clock is adjusted each leak interval by at most only a small fraction of a period of the output clock.

Jitter on the input signal is taken into account merely by drawing the output from a bit buffer and output rate governor thus acting automatically as a filter against input jitter.

The present invention provides several advantageous features. It does not require using integer or floating-point multiplication and division units; it can be implemented with simple digital components such as adders, comparators, counters, and registers. It can operate with either an internal clock or an external clock input; the external clock input is then able to service several desynchronizers. It provides low output jitter for isolated single or double pointer actions. It can respond quickly to large variations in incoming justification bit rates, avoiding buffer overflow/underflow. It is suitable for applications besides desynchronizing, such as retiming. And in simulations of a desynchronizer using the present invention and providing as output an E1 PDH signal extracted from the TU-12 component of an SDH signal, a desynchronizer according to the present invention met the jitter requirements for all four pointer test sequences specified in ITU-T Recommendation G.783.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
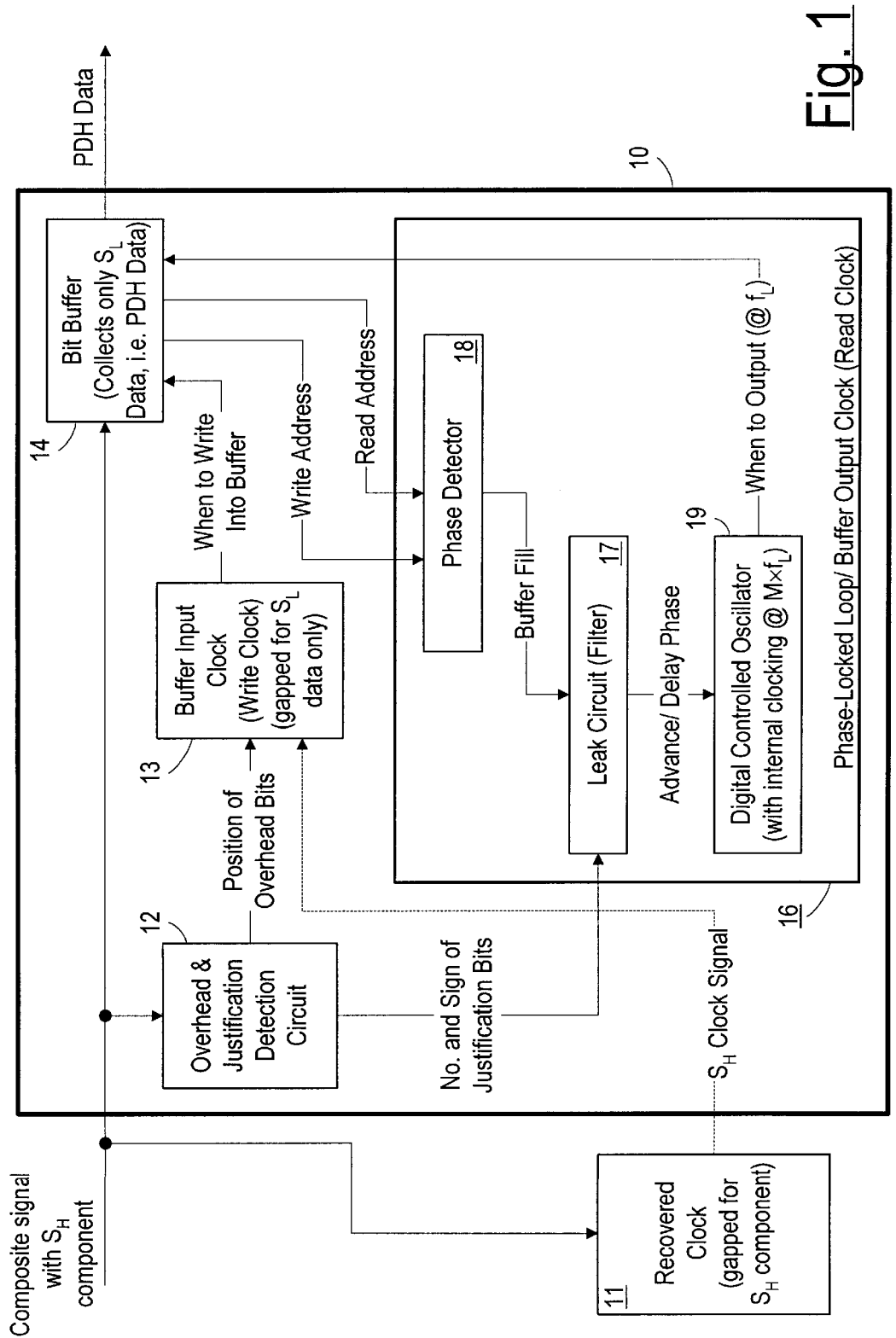
FIG. 1 is a block diagram of a desynchronizer using the present invention.

Referring now to FIG. 1, the present invention is shown as a phase locked loop 16 in a desynchronizer 10. The desynchronizer extracts from a composite signal a component $S_H$, then extracts from the component a lower rate component $S_L$ which it finally provides as its output at a frequency of substantially $f_L$. The desynchronizer, however, from time to time, momentarily alters the rate at which it produces bits of the output $S_L$. These intentional fluctuations in the output frequency $f_L$ allow the desynchronizer to account for both bit and byte justifications and jitter in the input signal $S_H$.

The present invention is of use whenever there is encoding of a lower rate signal $S_L$ in a higher rate signal $S_H$ in such a way that there may be some bytes in the payload of the higher rate signal that are left null and some bytes in the overhead of the higher rate signal that are sometimes used to convey data of the lower rate signal, and then sometimes when there are other bytes in the overhead of the higher rate signal encoding how these justification bytes are used.

A desynchronizer using a phase locked loop according to the present invention includes a bit buffer 14 for collecting bits of the output signal $S_L$. The phase locked loop 16 prompts output from the bit buffer at a frequency of substantially $f_L$, but will momentarily increase or decrease the time between output clock pulses to account for bit stuffing. The momentary increase or decrease in the time between prompts is essentially an advance or delay in the phase of the output (pulses) of a digital controlled oscillator (DCO) 19, part of the phase locked loop 16.

A leak circuit (filter) 17 controls the DCO, commanding it to advance or delay the phase of its output according to an algorithm intended to produce low jitter in the output signal $S_L$ of the desynchronizer. Were it not for justifications in the component input signal $S_H$, the leak circuit 17 would typically not command the DCO 19 to advance or delay the phase of its output. Then the desynchronizer 10 would produce the output signal $S_L$ at a frequency $f_L$ without any momentary changes in the phase of the output, i.e. output jitter. This would be possible because under the actions of an overhead and justification detection circuit 12 and the buffer input clock 13, all of the data for the $S_L$ output signal is staged in a bit buffer 14, and this data is accumulated at an average rate that is identical with the frequency at which pulses arrive at the bit buffer from the DCO 19 to prompt the bit buffer to output the $S_L$ signal.

The $S_L$ data is written into the bit buffer according to twice-gapped clock. The desynchronizer 10 receives as an input a clock signal for recovering the $S_H$ component of the composite signal. This clock signal for recovering the $S_H$ component is typically provided by a recovered clock circuit 11 external to the desynchronizer 10. Within the desynchronizer, an overhead and justification detection circuit 12 determines the position of overhead bits in the full composite signal and provides the position of the overhead bits to a buffer input clock 13, which also receives the $S_H$ clock signal provided by the recovered clock 11.

The OJDC 12 and buffer input clock 13 account for how the $S_L$ signal is encoded within the higher frequency $S_H$ signal. An $S_H$ signal for which a desynchronizer using the present invention would be suitable consists of frames, each frame consisting of a certain number of rows of columns of bytes of overhead and payload. The lower rate signal $S_L$ is conveyed essentially within the payload component of the $S_H$ signal, although some $S_L$ data may, from time to time, be conveyed by the overhead part of a frame of the $S_H$ signal, as explained below.

The OJDC 12 reads the overhead of each frame of the higher rate signal to determine how the justification bits and bytes are used and provides as an output the number and sign of the justification bits. For example, if a byte is used for slowing the bit rate of $S_L$ (i.e. the byte is left null), then the OJDC would provide at its output minus eight bits. The OJDC also provides as an output the position of the overhead bits of the $S_H$ signal. The buffer input clock 13 uses both the position of the overhead bits and the $S_H$ clock signal provided by the recovered clock 11 to figure when to instruct the bit buffer 14 to write data from the incoming signal with the $S_H$ component so as to end up with only $S_L$ data, meaning the PDH data to be output, including any negative justification bits (bits of the $S_L$ overhead used to convey PDH data).

The bit buffer 14 provides as outputs the write address and read address of the bit buffer. Then, the phase locked loop 16, using the write address and read address provided by bit buffer 14, and using the number and sign of the justification bits provided by the OJDC 12, has enough information to signal the bit buffer when to write out a bit of $S_L$ data so that the bit rate is substantially the expected $S_L$ bit rate (i.e. $f_L$), and any positive or negative justification is accounted for in a way that is intended to minimize output jitter.

Within the phase locked loop 16, a phase detector 18 uses the write address and read address to provide a buffer fill, i.e. information about the state of the buffer sufficient to determine whether the buffer is more full or less fall than its design nominal. A leak circuit 17 uses the buffer fill and the number and sign of the justification bits (from the OJDC 12) to do two things:

1) to determine whether to advance or to delay the phase of a DCO 19; and
2) to determine how long to wait before advancing or delaying the phase.

If the buffer fill is more than nominal, the leak circuit will command the DCO 19 to advance the phase of its output signal. This advancing will result in a pulse arriving at bit buffer 14 sooner than otherwise, and so momentarily speed up the rate at which $S_L$ data is output. This will be the result regardless of what the leak circuit receives as the number and sign of the justification bits. The justification bit information is used by the leak circuit only to figure how long to wait before issuing the next phase command to the DCO.

It is important that the buffer fill information be determined in such a way as to be relatively insensitive to how data arrives at the bit buffer. In the preferred embodiment, the write address and read address are provided to the phase detector after a certain number of bytes of each frame of the incoming signal are received by the desynchronizer. For example, in the case where the higher rate signal is an STM-1 signal, the buffer fill would be sampled by the phase detector after the third A2 byte is received, this sampling essentially filtering out the effects of fluctuations in the buffer fill due merely to the structure of a frame.

Leak circuit 17 computes a leak interval before expiration of the previous leak interval in part based on the expression $$N/(MB_{avg}),$$

where N is a designer specified integer, M is the ratio of the DCO clock frequency to the frequency $f_L$ of the output $S_L$ signal, and $B_{avg}$ is the most recently determined average incoming justification bit rate. Thus, if the incoming signal includes few justification bits, then the leak interval will be longer.

The leak interval is given essentially according to the formula provided above. It is important to understand, however, that although the leak interval can be expressed algebraically, the present invention can be implemented without components needed for calculating an algebraic expression. It is possible instead to implement the leak circuit based on tables using, for example, the number and sign of incoming justification bits (instead of a bit rate) as an index to select a leak interval.

It is obvious from what has so far been described that it is also possible that a desynchronizer according to the present invention might include a failsafe mode, one having a leak interval small enough that the desynchronizer can accommodate offsets greater than the maximum allowed by governing standards. In other words, to avoid underflow or overflow of the buffer in a worst case scenario of clock offsets greater than what standards allow, the desynchronizer would enter a failsafe mode in which it would execute phase changes more rapidly, after having to wait a smaller leak interval. Since each phase change enables the desynchronizer to speed up or slow down the rate at which data is read out of the buffer, dropping into a failsafe small-leak-interval mode accounts for both too high a data input rate as well as for too low an input data rate. To decide whether to enter the failsafe mode, the desynchronizer would sense whether the buffer fill is above or below the nominal fill by more than a threshold amount. If that ever occurs, the desynchronizer could abandon calculating the leak interval as has been described for normal modes of operation, at least until the buffer fill is restored to normal operating range. The drawback to entering failsafe mode is, obviously, unacceptable jitter in the output of the desynchronizer.

Figure 2:
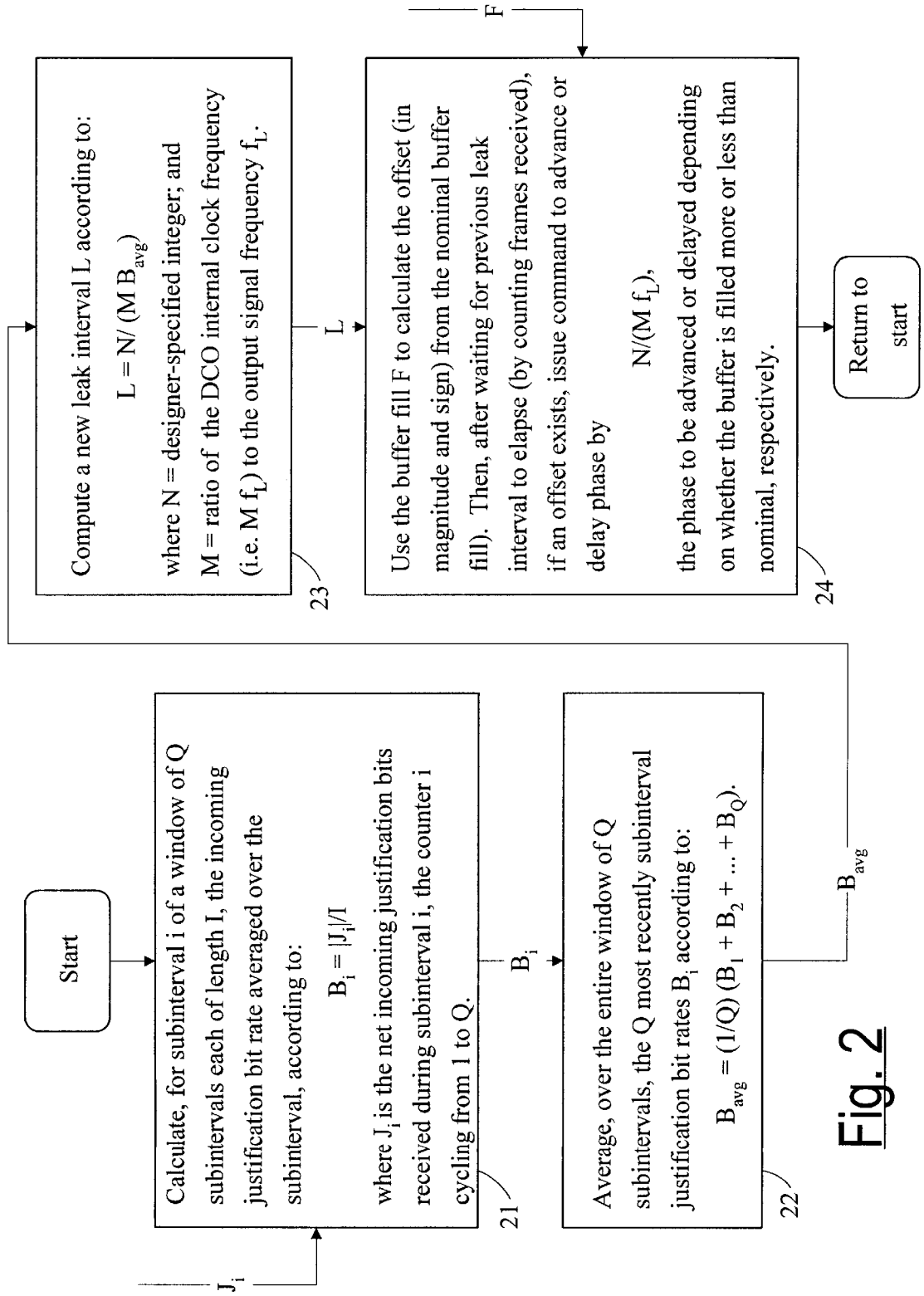
FIG. 2 is a process flow diagram of the operation of the present invention.

Referring now to FIG. 2, the steps followed by a phase locked loop, according to the present invention, during one leak interval are shown beginning with the leak circuit receiving in step 21 the number and sign of justification bits $J_i$ arriving in an $i^{th}$ subinterval of a window of Q subintervals each of length I. The leak circuit essentially calculates and records the average incoming justification bit rate $B_i$ for the $i^{th}$ subinterval according to step 21. Again, it is important to understand that the present invention may be implemented using indexed tables instead of components for calculating algebraic expressions; thus $B_i$ may be determined directly, using a table, from $J_i$ rather than the leak circuit having to calculate a quotient.

In step 22 the leak circuit is indicated as having recorded Q subinterval-averaged incoming justification bit rates; the leak circuit then calculates an average of the incoming justification bit rates over the Q subintervals, obtaining a value for the sliding window of Q subintervals. The overall length of the sliding window of Q subintervals corresponds to what the minimum length a leak interval can be, according to the present invention. Therefore, implicit in the present invention is the possibility that there will be unacceptable jitter because of an incoming justification bit rate that is too great for the smallest leak interval that used by the leak circuit, i.e., this minimum leak interval having a length of Q subintervals each of length I.

Step 23 shows the algebraic determination of the leak interval in terms of the designer specified integer N and the ratio M of the DCO internal clock frequency to the output frequency $f_L$. In the present invention, the ratio of N to M is a small fraction typically 1/50. In step 24 the leak interval and buffer fill are used to determine whether to send a command to advance or delay the phase of the DCO and to issue a command corresponding to that determination. If the buffer fill is greater than nominal after the last leak interval expires, the phase locked loop of the present invention advances the phase of the pulse sent to the bit buffer by the amount shown in step 24, i.e.

$$N/(Mf_L)$$

an amount proportional to the ratio of N to M and inversely proportional to the frequency of the output signal $f_L$. Since the ratio of N to M is typically a small fraction and the inverse of the output frequency $f_L$ is the period of the output frequency signal, the phase is advanced or delayed by only a small fraction of the period of the output signal.

In the preferred embodiment the value of N is one or small. For values of N greater than one, the advance or delay of phase is greater so that less time is required for the desynchronizer to leak a bit (in either a positive or negative sense). The time to leak a bit is the time required for the desynchronizer to advance or delay the phase of the output clock by one entire period, i.e. $1/f_L$. Thus if a phase change of $N/(Mf_L)$ is commanded after successive leak intervals each of length L, the time required to leak one bit is $$\frac{\text{period of } S_L}{\text{phase change per command}} \text{ (time between commands)} =$$

$$\frac{1/f_L}{N/(M \cdot f_L)} L = \frac{M}{N} L$$

Figure 3:
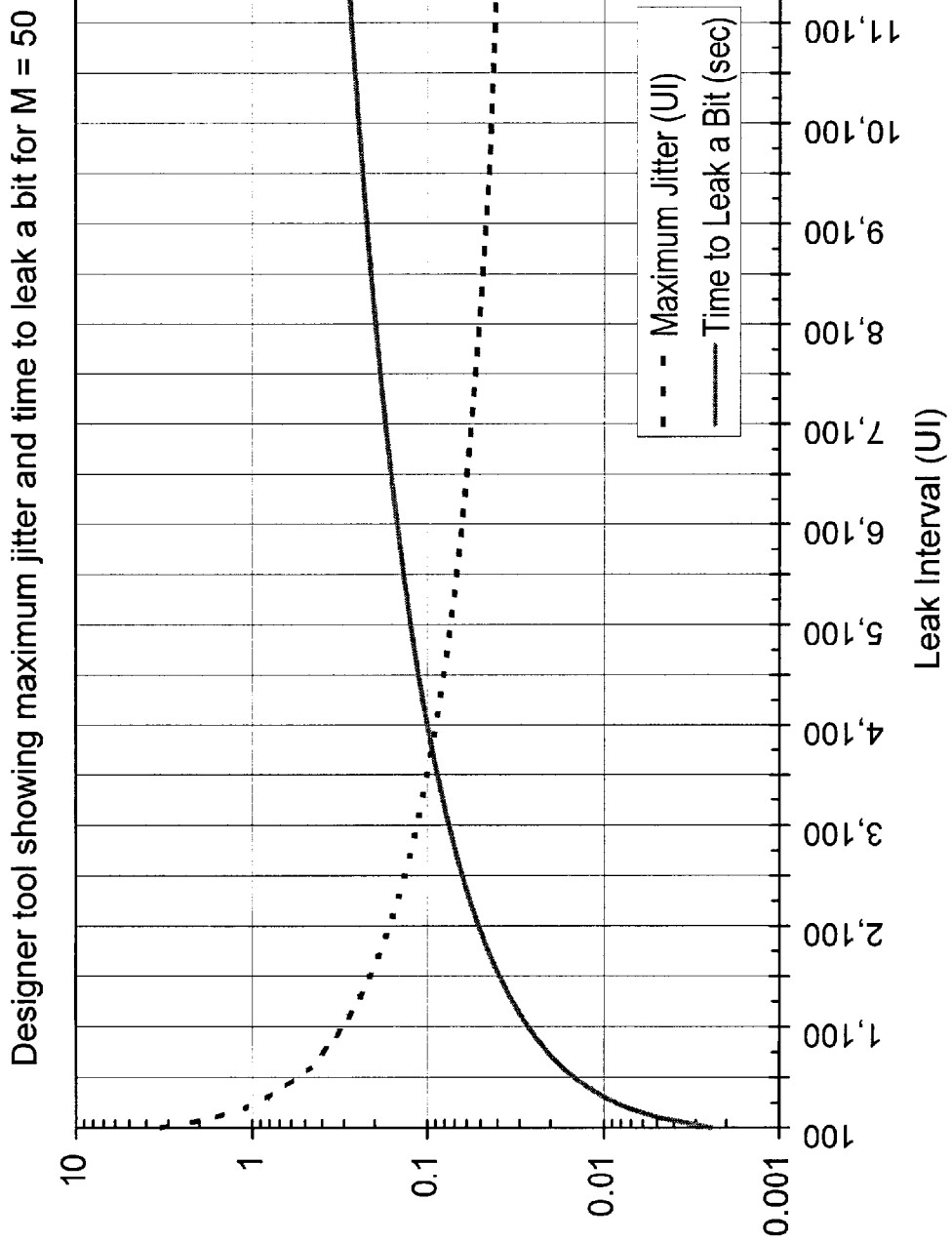
FIG. 3 is a plot of the maximum jitter and time needed to leak a bit, as a function of leak interval, for a value of 50 for the ratio M of the internal clock of the present invention to the ideal output signal clock frequency $f_L$.

Referring now to FIG. 3, a graphic that would be used by a designer is shown in the case of a desynchronizer being used to provide an E1 PDH signal (2.048 Mhz) from the TU-12 component of an SDH input signal. Here, the ratio M is selected to be 50. In this case, the designer would use the graphic of FIG. 3, showing the maximum jitter and time to leak a bit as a function of the leak interval, to determine how to quantize the possible leak interval values. In other words, in the preferred embodiment, a desynchronizer would not vary the leak interval over a continuous range, but rather would choose as a value for the leak interval one of a finite number of possible values, the quantized values.

The designer would determine perhaps six to twelve quantized values of the leak interval, each associated with a different mode of operation, based on the characteristics of the input signal relative to the output signal and based also on desired jitter performance. To handle isolated justifications, the designer would want to include as a mode a leak interval corresponding to a maximum jitter of approximately (1/M) unit intervals (UI), where a unit interval is the period of the output signal, i.e. $1/f_L$.

Note that in FIG. 3, the curve providing time to leak a bit derives from the leak interval according to the relation:

$$T_{leak} = \frac{M \cdot L}{f_L}$$

because (for N=1) M phase changes are needed to leak one bit, which requires one leak interval (and converting from unit intervals to seconds using the conversion factor $1/f_L$). As the leak interval becomes longer, the maximum jitter asymptotically approaches 1/M (in unit intervals), or, for the case shown in FIG. 3, the value of 0.02 UI.

To prevent buffer underflow or overflow, a designer would also want to include a mode with a time to leak a bit that is less than the minimum needed to accommodate the maximum frequency offsets allowed for SDH and PDH clocks; i.e. the designer should include a mode that allows leaking bits a little faster than should ever be needed in practice. In the preferred embodiment for the application corresponding to FIG. 3, six leak interval modes are used. The leak interval is 29,952 UI for mode 1; 11,520 UI for mode 2; 8,192 UI for mode 3; 3,584 UI for mode 4; 2,560 UI for mode 5; and 256 UI for mode 6. Every 0.5 sec, the leak circuit calculates the incoming justification bit rate for the last 6 sec.

It is obvious from what has been said that the desynchronizer of the present invention can be used to smooth jitter associated with either bit justification or byte justification in any system where a synchronous composite signal includes a tributary signal from which a plesiochronous signal is to be extracted. Nothing that has been said should be interpreted to restrict the present invention to particular signal data structures.

It should be further understood that the above-described arrangements are only illustrative of the application of the principles of the present invention. In particular, as suggested above, it is possible to control jitter using a leak circuit according to the present invention implemented without any integer or floating point multiplication or division units. The leak circuit can be implemented with simple digital components such as adders, comparators, counters, and registers. In such an implementation, instead of calculating $B_i$, the circuit essentially calculates I $B_i$, in which I is the constant subinterval length, by simply determining the net justification bits in the $i^{th}$ subinterval of length I. Next, the leak circuit calculates the summation over all of the subintervals of the sliding window of Q subintervals, but does not divide by the length of the sliding window. Finally, the leak circuit uses a table to map the calculated summations to a leak interval mode. Numerous other modifications and alternatives arrangements may be devised by those skilled in the art without departing from the spirit and scope of the present invention, and the appended claims are intended to cover such modifications and arrangements.

What is claimed is:

1. An apparatus for use in a desynchronizer for controlling jitter in the output of the desynchronizer, the desynchronizer for extracting a lower rate signal $S_L$ from an input higher rate signal $S_H$, both signals organized as successive frames of data, each frame of the higher rate signal providing for justification opportunities, the higher rate signal including an overhead part and a payload part of each frame, the overhead part of each frame indicating use of justification opportunities in the frame, the desynchronizer including a bit buffer and a means for causing the bit buffer to write to its internal memory all bits of the lower rate signal $S_L$ and only bits of the lower rate signal $S_L$, thereby causing a certain buffer fill of the bit buffer, the buffer fill decreasing as bits of the $S_L$ signal are caused to be read out of the bit buffer, and the desynchronizer further including a means for providing use of justification opportunities in each $S_H$ frame based on encoding in the overhead part of the $S_H$ frame, the apparatus for controlling jitter comprising:

a) a phase detector responsive to signals provided by the bit buffer useful in determining the buffer fill, for providing an indication of the buffer fill;

b) a leak circuit and a digitally-controlled oscillator (DCO), the leak circuit responsive to a signal for each frame of the higher rate signal indicating justification use in the frame, the leak circuit for providing a phase-adjust command, the DCO responsive to the phase-adjust command and providing as a DCO output signal pulses used for clocking data out of the bit buffer at a rate that depends on the phase-adjust command;

wherein the leak circuit determines an average incoming justification bit rate based on the signals indicating justification use and received in a sliding time window and then determines a corresponding leak interval indicating how long to wait to issue a next phase-adjust command; wherein the DCO has a means for clocking at a rate M $f_L$ substantially greater than the rate $f_L$ of the lower rate signal $S_L$; wherein the leak circuit waits until the preceding leak interval has expired before sending the next phase-adjust command to the DCO; and wherein in response to a phase-adjust command the DCO adjusts the phase of its output signal by a predetermined fraction of the period of the lower rate signal $S_L$ specified in terms of the rate M $f_L$ of the means for clocking the DCO.

2. An apparatus as claimed in claim 1, wherein each phase-adjust command adjusts the phase by the same magnitude, whether advancing or delaying the phase.

3. An apparatus as claimed in claim 1, wherein the DCO always adjusts the phase by the magnitude N/(M $f_L$) where N is a designer-specified integer smaller than M.

4. An apparatus as claimed in claim 3 wherein the leak interval is determined based on the expression N/(M $B_{avg}$), in which $B_{avg}$ is the average incoming justification bit rate, as estimated by the leak circuit, occurring during a recent time interval.

5. An apparatus as claimed in claim 4, wherein the leak interval is quantized so as to provide only a finite plurality of pre-determined leak interval modes from which the leak circuit can select to operate.

6. An apparatus as claimed in claim 5, wherein the buffer fill is determined after a pre-determined number of bytes of a frame bearing $S_L$ data have arrived at the buffer, thereby producing buffer fill information that is less sensitive to changes in the buffer fill due solely to differences in the rates at which data fills the buffer and data is read out of the buffer.

7. An apparatus as claimed in claim 1, wherein the means for clocking the DCO at a rate M $f_L$ substantially greater than the rate $f_L$ of the lower rate signal $S_L$ is external to the DCO and is coupled not only to the DCO in the desynchronizer but also to a DCO in another desynchronizer, thereby providing clocking for more than one desynchronizer.

* * * * *